(12) United States Patent
Shiraishi et al.

(10) Patent No.: US 6,394,608 B1
(45) Date of Patent: May 28, 2002

(54) DISPLAY DEVICE AND DISPLAY OPTICAL SYSTEM UNIT

(75) Inventors: Mikio Shiraishi, Yokohama; Yasuo Ohtsuka, Chigasaki; Kenji Fuse, Yokosuka; Toru Numata, Yokohama, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/446,336

(22) PCT Filed: Jun. 19, 1998

(86) PCT No.: PCT/JP98/02740
§ 371 (c)(1),
(2), (4) Date: Dec. 20, 1999

(87) PCT Pub. No.: WO98/59278
PCT Pub. Date: Dec. 30, 1998

(30) Foreign Application Priority Data

Jun. 20, 1997 (JP) .............................................. 9-164295

(51) Int. Cl.[7] ........................... G03B 21/18; G03B 21/16
(52) U.S. Cl. ............................... 353/57; 353/52; 353/60; 353/61
(58) Field of Search .............................. 353/52, 54, 57, 353/58, 60, 61, 119; 349/5; 362/276

(56) References Cited

U.S. PATENT DOCUMENTS

| | | | | |
|---|---|---|---|---|
| 5,090,800 A | * | 2/1992 | Ushiro ........................ 353/71 |
| 5,170,194 A | * | 12/1992 | Kurematsu et al. ........... 353/52 |
| 5,313,234 A | * | 5/1994 | Edmonson et al. ........... 353/61 |
| 5,508,830 A | * | 4/1996 | Imoto et al. .................... 349/5 |
| 5,803,566 A | * | 9/1998 | Ogino .......................... 353/60 |
| 5,829,868 A | * | 11/1998 | Hutton ........................ 362/276 |
| 6,132,049 A | * | 10/2000 | Yamaguchi et al. .......... 353/61 |

* cited by examiner

*Primary Examiner*—Russell Adams
*Assistant Examiner*—R. Fuller
(74) *Attorney, Agent, or Firm*—Antonelli, Terry, Stout & Kraus, LLP

(57) ABSTRACT

A display device, such as a reflecting type liquid crystal projector, in which dust is prevented from becoming attached to a reflecting type light valve, such as a liquid crystal panel, and an improvement in cooling effect are attained. The device has a structure having a partition wall for forming an enclosed space including at least an incidence/emission optical system of the reflecting type light valve. The reflecting type light valve is provided in the partition wall such that a light incidence/emission surface of the light valve faces into the side of the enclosed space. A part opposite to the light incidence/emission surface of the reflecting type light valve faces outside the enclosed space. In a structure where a cooling arrangement or a thermal conductive partition wall is connected to the part opposite to the light incidence emission surface, the cooling effect is further improved.

32 Claims, 12 Drawing Sheets

DISPLAY DEVICE AND DISPLAY OPTICAL SYSTEM UNIT

TECHNICAL FIELD

The present invention relates to a display device, such as a liquid crystal projector device, a liquid crystal television set, and a projection type display device or the like, which projects a video image on a screen by utilizing a light valve device, such as a liquid crystal panel.

BACKGROUND OF THE INVENTION

There is a projection type display device, such as a liquid crystal projector, which changes light from a light source, such as an electric bulb, to a contrast per pixel image using a light valve device, such as a liquid crystal panel, and projects an enlarged image on a screen or the like. Further, as the light valve device of the display device, devices of two operation types, a light transmitting type light valve device and a reflecting type light valve device, are known.

The light valve device generally comprises a semiconductor driving device and an optical function material such as liquid crystal or the like. To normally operate both constituents, a predetermined temperature (e.g., 60° C.) or lower must be maintained in the device. On the other hand, light from the light source, except for light that is to be finally projected, is absorbed by the light valve device and its peripheral optical elements and the like, and this light turns to heat. Accordingly, in a projection type video display device, the light valve device must be cooled so as not to overheat beyond a range of normal operation. The significance of cooling is becoming more and more important with an increase in the intensity of the light-source light for recent high-brightness projection video images, since the increase in the light-source light intensity increases the amount of heat generation which occurs in the light valve device.

Further, in such a display device, as the optical system brings the light of the image from the light valve device into focus, images of foreign particles, such as dust attached around the light valve device, are enlarged and projected on the screen or the like. Accordingly, prevention of dust around the light valve device is also an important problem to be solved.

Conventionally, a display device using a reflecting type light valve device is disclosed in Japanese Published Unexamined Patent Application No. Sho 64-5174. Further, a technique to cool the reflecting type light valve device in a display device is disclosed in Japanese Published Unexamined Patent Application No. Sho 62-294230. According to this technique, a cooling device is provided on the rear of a liquid crystal panel operating as the reflecting type light valve device.

Further, a technique to prevent dust in the display device is disclosed in Japanese Published Unexamined Patent Application, No. Hei 7-152009. According to this technique, a liquid crystal panel operating as a light transmitting type light valve device is placed within an enclosed space, and air within the enclosed space is circulated to radiate heat generated by the liquid crystal panel and transmit the heat to the outside of the enclosed space.

In the device disclosed in Japanese Published Unexamined Patent Application No. Sho 64-S174, the cooling of the light valve device and dust prevention around the light valve device are not considered, and the disturbance of normal operation due to the above-described overheating and the occurrence of shadows on the screen due to dust have not been fully considered.

Further, in the technique disclosed in Japanese Published Unexamined Patent Application No. Sho 62-294230, the prevention of dust around the light valve device is not considered, and the occurrence of shadows on the screen due to dust has not been fully considered.

Further, in the technique disclosed in Japanese Published Unexamined Patent Application No. Hei 7-152009, since the cooling is performed via the air present within the enclosed space, efficient cooling cannot be expected. Further, in a case where the amount of heating increases due to an increase in the light-source light intensity, the light valve device might not be sufficiently cooled. In this case, the display device cannot be normally operated, and this problem has not been fully considered.

Accordingly, the present invention has an object to provide a projection type display device which efficiently performs dust prevention around the light valve device and cooling of a light valve device.

SUMMARY OF THE INVENTION

To attain the foregoing object, the present invention provides various features.

As a first feature, there is provided a display device which performs image display based on light reflected from a reflecting type light valve means, wherein said reflecting type light valve means is provided in a partition wall forming an enclosed space including at least an incidence/emission optical system of said reflecting type light valve means, in a state where at least a part opposite to a light incidence/emission surface of said light valve means is connected to cooling means disposed outside said enclosed space.

As a second feature, there is provided a display device which performs image display based on light reflected from a reflecting type light valve means, comprising: a partition wall that forms an enclosed space including at least an incidence/emission optical system of said reflecting type light valve means, wherein said reflecting type light valve means is provided in said partition wall such that a light incidence/emission surface of said light valve means is set on the side of said enclosed space, and wherein a part opposite to said light incidence/emission surface is connected to cooling means.

As a third feature, a display device is provided which generates an image display based on light reflected from a reflecting type light valve means, comprising: a partition wall that forms an enclosed space including at least an incidence/emission optical system of said reflecting type light valve means, wherein said reflecting type light valve means is provided in said partition wall such that a transparent member is provided on a light incidence/emission surface of said light valve means, and a part opposite to said light incidence/emission surface is connected to cooling means outside said enclosed space.

As a fourth feature, a display device is provided which generates an image display based on light reflected from a reflecting type light valve means, comprising: a partition wall that forms an enclosed space including at least an incidence/emission optical system of said reflecting type light valve means, wherein said reflecting type light valve means is provided in said partition wall such that a light incidence/emission surface of said light valve means is on the side of said enclosed space, and wherein a radiation member is connected to a part opposite to said light incidence/emission surface such that said radiation member is cooled by a cooling member.

As a fifth feature, a display device is provided which generates an image display based on light reflected from a reflecting type light valve means, comprising: a partition wall that forms an enclosed space including at least an incidence/emission optical system of said reflecting type light valve means, and cooling means, disposed outside said enclosed space, for cooling at least said partition wall, wherein said reflecting type light valve means is provided within said enclosed space, and wherein a part opposite to a light incidence/emission surface of said light valve means is connected to said partition wall, whereby said reflecting type light valve means is cooled by said cooling means via said partition wall.

As a sixth feature, a display device is provided which generates an image display based on light reflected from a reflecting type light valve means, wherein said reflecting type light valve means is provided in a partition wall forming an enclosed space including at least an incidence/emission optical system of said reflecting type light valve means.

As a seventh feature, a display device is provided which generates an image display based on light reflected from a reflecting type light valve means, comprising: a partition wall that forms an enclosed space including at least an incidence/emission optical system of said reflecting type light valve means, wherein said reflecting type light valve means is provided in said partition wall such that a light incidence/emission surface of said light valve means is on the side of said enclosed space, and a part opposite to said light incidence/emission surface is outside said enclosed space.

As an eighth feature, a display device is provided which generates an image display based on light reflected from a reflecting type light valve means, comprising: a partition wall that forms an enclosed space including at least an incidence/emission optical system of said reflecting type light valve means, wherein said reflecting type light valve means is provided in said partition wall such that a transparent member is provided on a light incidence/emission surface of said light valve means and a part opposite to said light incidence/emission surface is outside said enclosed space.

As a ninth feature, a display device is provided which receives light from a light source into a reflecting type light valve means and generates an image display based on reflected light, comprising: a partition wall that forms an enclosed space including at least an incidence/emission optical system of said reflecting type light valve means, wherein said reflecting type light valve means is provided in said partition wall such that a light incidence/emission surface of said light valve means is on the side of said enclosed space, and wherein a radiation member is connected to a part opposite to said light incidence/emission surface.

As a tenth feature, a display device is provided which generates an image display based on light reflected from a reflecting type light valve means, comprising: a partition wall that forms an enclosed space including at least an incidence/emission optical system of said reflecting type light valve means and that has thermal conductivity, wherein said reflecting type light valve means is provided in said enclosed space, and wherein a part opposite to a light incidence/emission surface of said light valve means is connected to said partition wall.

As an eleventh feature, a display optical system unit is provided which receives light from a light source into a reflecting type light valve means, then passes reflected light through a projection lens, and forms image display projection light, comprising: a partition wall that forms an enclosed space including at least an incidence/emission optical system of said reflecting type light valve means, wherein said reflecting type light valve means is provided in said partition wall in a state where a part opposite to a light incidence/emission surface of said light valve means is connected to cooling means outside said enclosed space.

As a twelfth feature, a display optical system unit is provided which receives light from a light source into reflecting type light valve means, then passes reflected light through a projection lens, and forms image display projection light, comprising: a partition wall that forms an enclosed space including at least an incidence/emission optical system of said reflecting type light valve means, wherein said reflecting type light valve means is provided in said partition wall in a state where a transparent member is provided on a light incidence/emission surface of said light valve means.

As a thirteenth feature, a display optical system unit is provided which receives light from a light source into reflecting type light valve means, then passes reflection light through a projection lens, and forms image display projection light, comprising: a partition wall that forms an enclosed space including at least an incidence/emission optical system of said reflecting type light valve means, wherein said reflecting type light valve means is provided in said partition wall in a state where a light incidence/emission surface of said light valve means is on the side of said enclosed space, and a radiation member is connected to a part opposite to said light incidence/emission surface such that said radiation member is cooled by cooling means.

As a fourteenth feature, a display optical system unit is provided which receives light from a light source into reflecting type light valve means, then passes reflection light through a projection lens, and forms image display projection light, comprising: a partition wall that forms an enclosed space including at least an incidence/emission optical system of said reflecting type light valve means and that has thermal conductivity, wherein said reflecting type light valve means is provided in said enclosed space, and wherein a part opposite to a light incidence/emission surface of said light valve means is connected to said partition wall, whereby said reflecting type light valve means can be cooled by external cooling means via said partition wall.

According to the above constructions, the occurrence of shadows in a projection image due to dust can be prevented. Further, radiation and cooling on the reflecting type light valve means can be efficiently performed.

BEST MODE FOR CARRYING OUT THE INVENTION

Hereinbelow, the present invention will be described in detail with reference to the accompanying drawings.

A first embodiment of the present invention will be described with reference to FIGS. 1 to 4.

Figure 1:
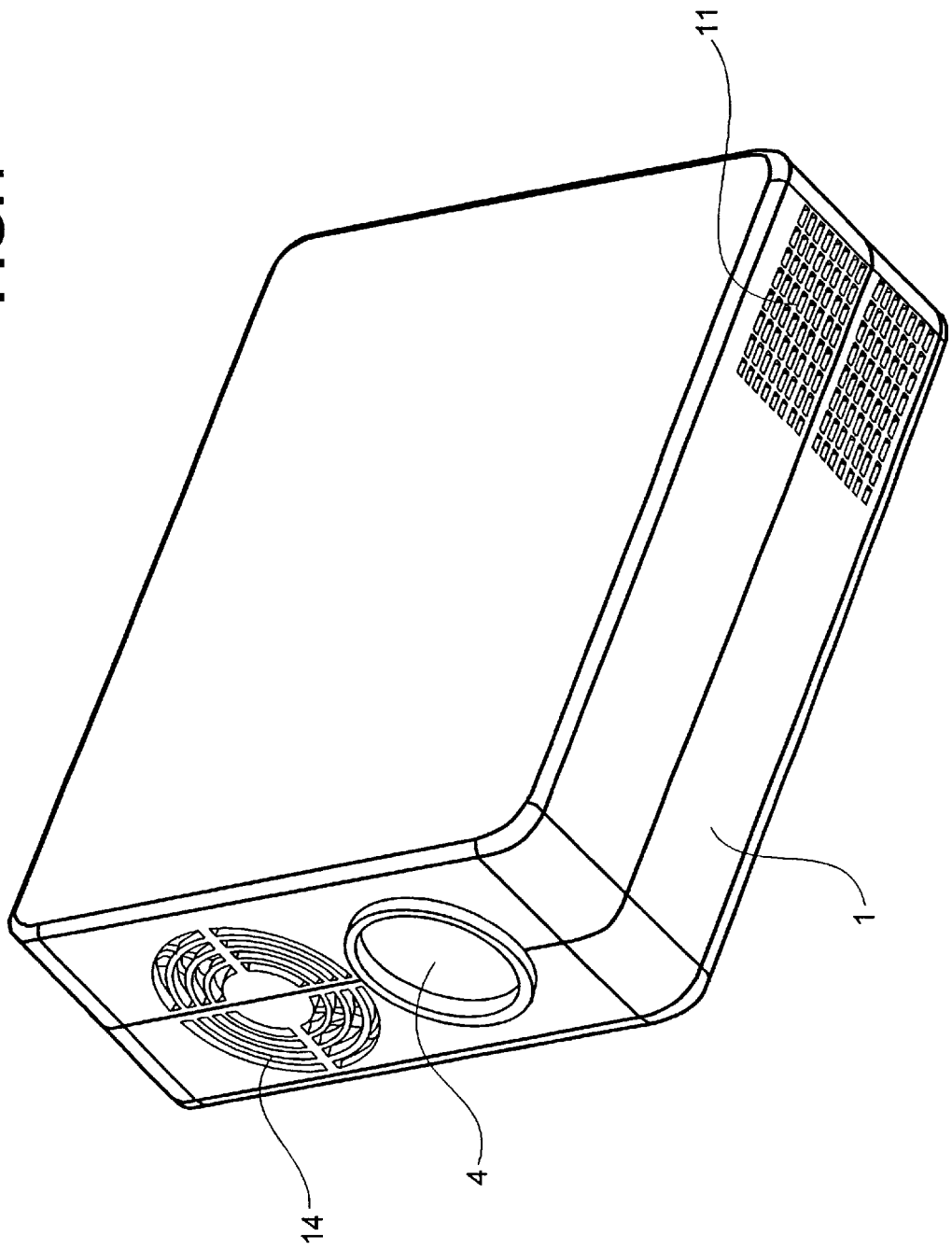
FIG. 1 is a perspective view showing the external appearance of a display device according to a first embodiment of the present invention.

FIG. 1 shows the external appearance of a display device. In a display device 1 shown in FIG. 1, a part of a projection lens 4 is exposed outside an outer casing of the display device. A video image is projected on an external screen or the like from the projection lens 4. Further, an outlet port 14 is provided in the front side, and an inlet port 11 is provided near the rear side. External air is taken from the inlet port 11 and is used for cooling the inside the device, then the heated air is discharged from the outlet port 14 to the outside of the device.

Figure 2:
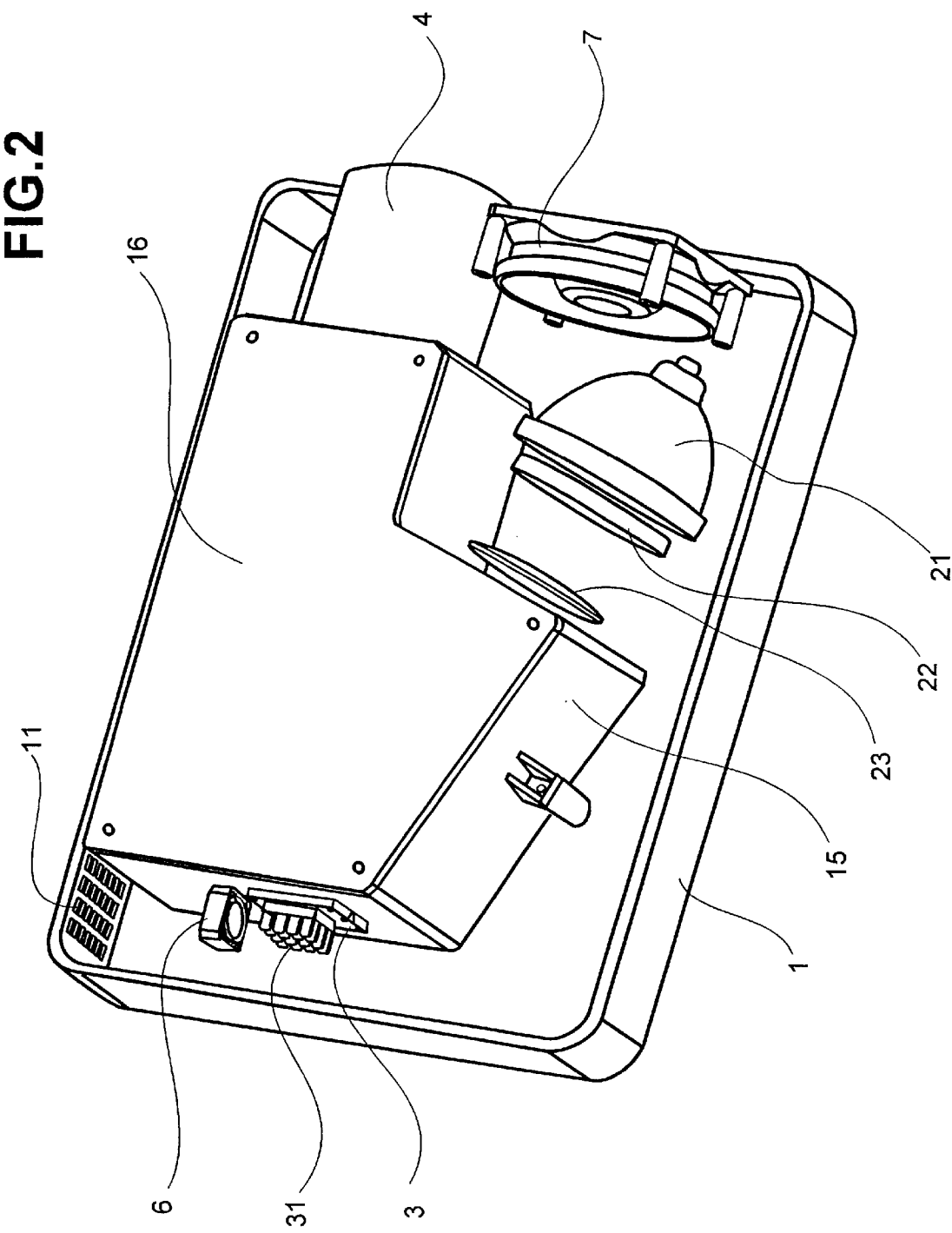
FIG. 2 is a perspective view showing the internal structure of the display device according to the first embodiment of the present invention.

FIG. 2 shows the display device of FIG. 1 as seen when a side cover of the device is removed. As shown in FIG. 2, a video display mechanism is provided in the display device 1. The video display mechanism comprises an optical chassis 15 sealed by a cover 16 and light source members 21 to 23. The details of the respective parts shown in FIG. 2 will be described later with reference to FIG. 4.

Figure 3:
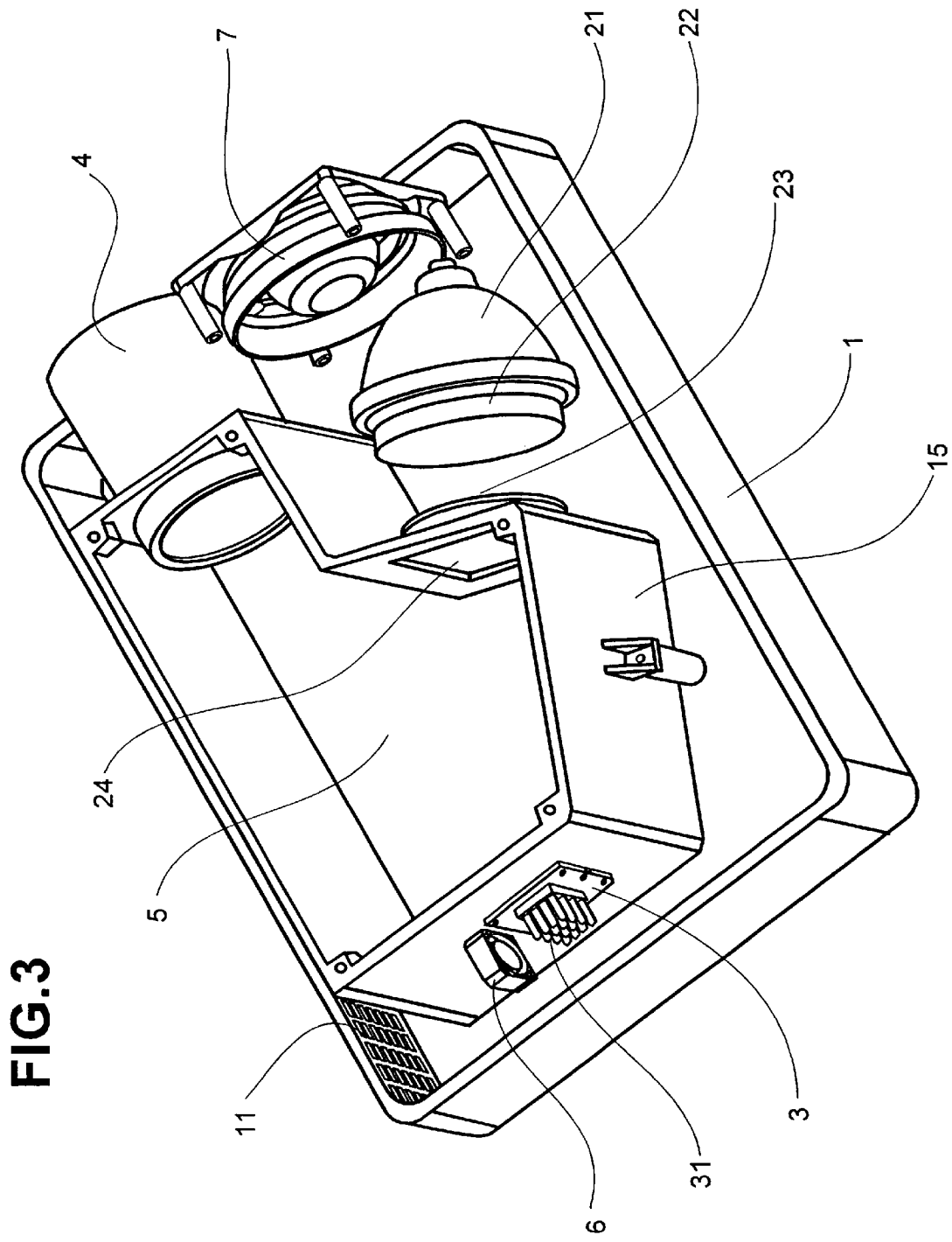
FIG. 3 is a perspective view showing the internal structure of an optical chassis of the display device according to the first embodiment of the present invention.

FIG. 3 shows the structure of FIG. 2 as seen when the cover 16 of the optical chassis 15 is removed. The inside of the optical chassis 15 comprises a space 5 which is sealed from the outside to prevent dust from entering by attachment of the cover 16. In the following description of the embodiment, this space 5 will be referred to as an "enclosed space" and the sealed chassis 15 will be referred to as an "enclosure".

Hereinbelow, the respective parts will be described in detail with reference to FIG. 4, which represents a cross section of the display device 1 in this status.

Figure 4:
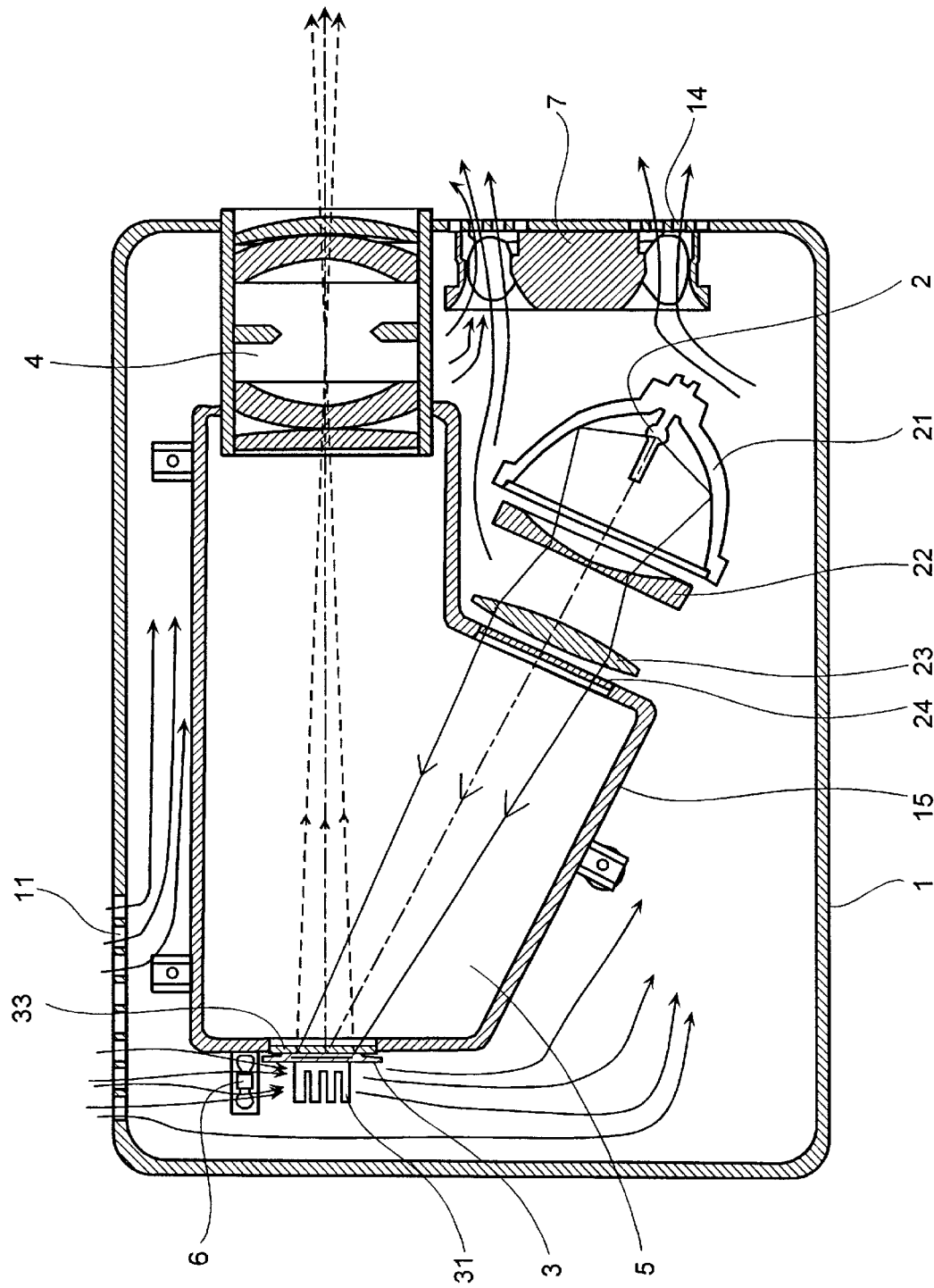
FIG. 4 is a cross sectional view showing the structure of the display device according to the first embodiment of the present invention.

As shown in FIG. 4, a video display mechanism is provided in the display device 1. The video display mechanism comprises the optical chassis 15 and a light source portion. Light emitted from the light source portion is reflected by a light-polarizing type reflection liquid crystal panel 3, operating as a reflecting type light valve, and the reflected light is directed toward the outside of the device 1 via the projection lens 4, where the light is projected on a screen (not shown). The light source portion includes an electric bulb 2, a reflector 21 and condenser lenses 22 and 23. Light from the electric bulb 2 is collected by the reflector 21, is formed into an approximately collimated light beam via condenser lenses 22 and 23, and passes into the optical chassis 15.

The light from the condenser lens 23 passes through an incidence cover glass 24 made of transparent material into the optical chassis 15. The incidence cover glass 24 is provided as a part of a partition wall to seal the inside of the optical chassis 15. The light which has entered the optical chassis 15 passes through a cover glass 33 provided in front of the liquid crystal panel 3, and is reflected by the liquid crystal panel 3, which operates as a reflecting type light valve device. The cover glass 33 is provided as a part of the partition wall to seal the inside of the optical chassis 15. The liquid crystal panel 3 is in tight contact with the cover glass 33, so that no extraneous gas enters between the cover glass 33 and the liquid crystal panel 3.

The light reflected by the liquid crystal panel 3 again passes through the cover glass 33, then, passes through the projection lens 4, and is projected toward the outside. The projection lens 4 is also provided as a part of the partition wall of the optical chassis 15 to seal the inside of the optical chassis 15.

In the entire optical system, among the optical axes, a section from the incidence cover glass 24 to the cover glass 33 and a section from the cover glass 33 to the projection lens 4 are disposed inside the enclosed space 5 and are sealed from the outside. On the optical axes, the front and rear of the liquid crystal panel 3 are in enclosed spaces; therefore, dust or the like cannot enter from the outside. Accordingly, when an image displayed on the liquid crystal panel 3 is projected and the focal point of the projection lens 4 is adjusted to obtain a sharp image from the liquid crystal panel 3, since the liquid crystal panel 3 and its peripheral portion are in an enclosed space, dust or the like can not collect around the focal point and so no shadow occurs in the projected video image.

The liquid crystal panel 3 comprises a two-dimensionally arranged matrix of liquid crystal cells corresponding to two-dimensionally arranged pixels (e.g., 1024 pixels in a horizontal direction and 768 pixels in a vertical direction, i.e., total 786432 pixels) for forming an image. The liquid crystal panel controls whether light is reflected or absorbed by the liquid crystal panel 3, per pixel, by selectively controlling the ON/OFF state of each liquid crystal cell based on an image signal supplied from an image display circuit (not shown), whereby an image is displayed. For example, for a liquid crystal panel in which light is reflected when the liquid crystal is in the off state, and light is absorbed when the liquid crystal is in the on state, a pixel corresponding to a bright part of an image is turned off, while a pixel corresponding to a dark part is turned on. In this manner, reflection and absorption is selectively controlled for respective pixels which form a two dimensional video image, and an image is displayed on the two-dimensional surface of the liquid crystal panel 3. Then, the image formed on the surface of the liquid crystal panel 3 is projected as an enlarged image on the external screen (not shown) by the projection lens 4.

The liquid crystal panel 3 reflects or absorbs incident light in accordance with the contents of an image to be displayed. The absorbed light becomes thermal energy and raises the temperature of the liquid crystal panel. Further, even when light is reflected, all the light is not reflected, but a part of the light is absorbed into the liquid crystal panel 3 and becomes thermal energy. When the generated thermal energy is at a maximum level, the entire content of the image is black, for example, and almost all the incident light is absorbed. That is, to operate the liquid crystal panel within its operational temperature range, radiation corresponding to the energy generated in the panel must be provided.

In the present embodiment, thermal energy generated in the liquid crystal panel 3 is radiated and cooled by cooling means provided on a radiation surface on the rear side of the liquid crystal panel 3. That is, a radiation fin 31 is attached to the rear surface of the liquid crystal panel 3, and the heat generated in the liquid crystal panel 3 is transmitted to the radiation fin. The radiation fin 31 is cooled by an air flow from a radiation fan 6. The radiation fan 6 is supplied with outside air sucked into the inlet port 11. Thus, the radiation fin 31 is cooled with air having a temperature which is always close to that of the outside air.

For cooling the entire display device 1, the outside air is sucked into the inlet port 11 by a cooling fan 7 and is discharged from the outlet port 14 The outside air is always supplied around the radiation fan 6 and the radiation fin 31 to provide cooling for the rear of the panel.

Further, the air used for cooling around the liquid crystal panel is also used for cooling around the electric bulb 2, i.e., the reflector 21 and the condenser lenses 22 and 23, and is discharged by the fan 7 from the outlet port 14 to the outside the device 1. By this arrangement, the heat generated in the device can be effectively discharged to the outside the device.

In this manner, in the first embodiment, parts related to the optical system of the liquid crystal panel 3 are sealed in an enclosed space, and heat generated in the enclosed space is sent to the outside the enclosed space and radiated away. This attains both advantages of prevention of dust on the side of the incidence/emission surface of the liquid crystal panel and prevention of a temperature rise.

Figure 5:
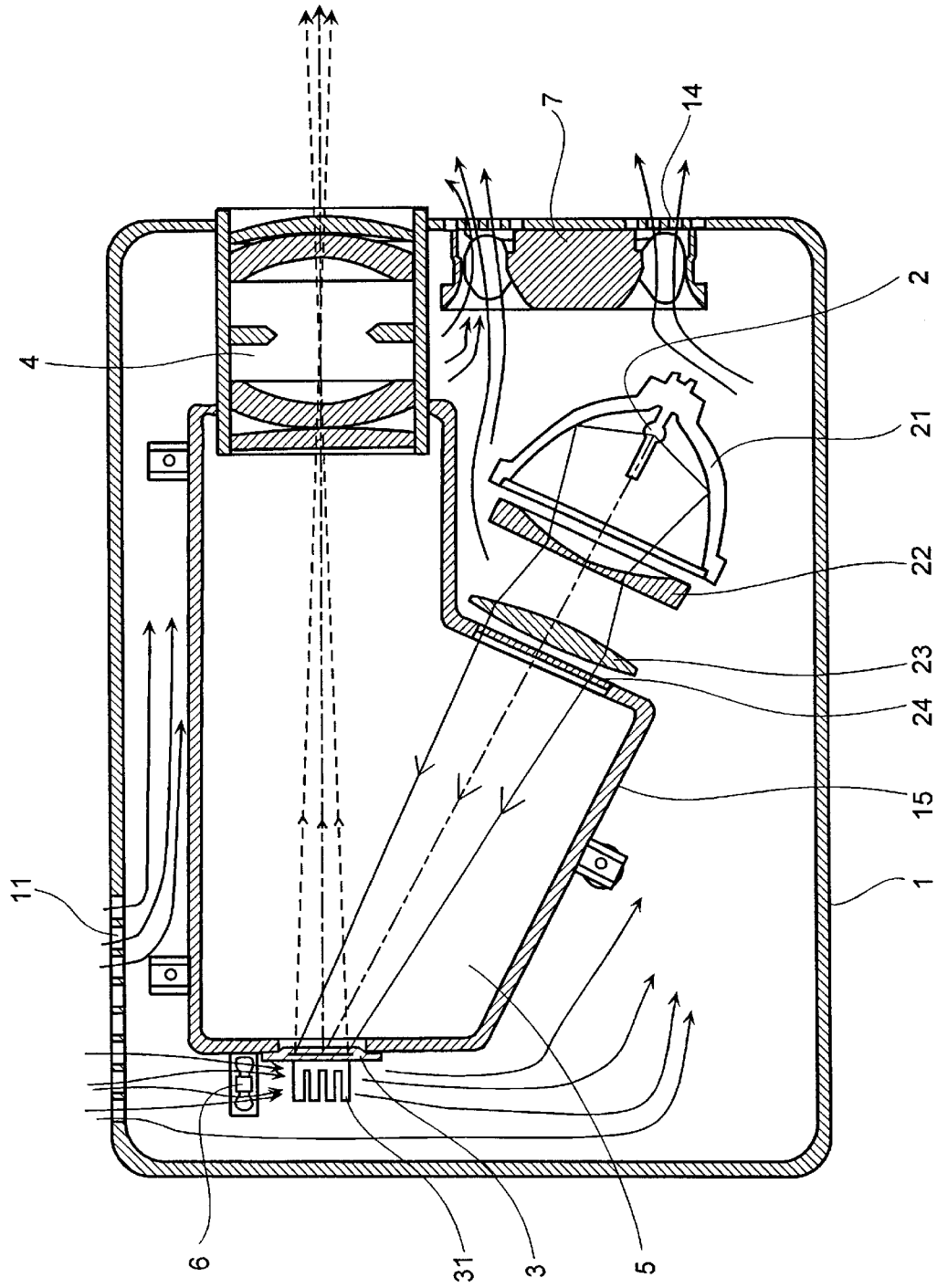
FIG. 5 is a cross sectional view showing the structure of the display device according to a second embodiment of the present invention.

Hereinbelow, a second embodiment of the present invention will be described. FIG. 5 shows the structure of the display device 1 according to the second embodiment. FIG. 5 shows a cross section of the display device 1 as in the case of FIG. 4.

The difference between this embodiment and the first embodiment shown in FIG. 4 is that, in the present embodiment, the liquid crystal panel 3, operating as a reflecting type light valve means, is directly provided in the wall of the enclosed space 5, so that the liquid crystal panel 3 forms part of the partition wall of the optical chassis 15. The radiation surface on the rear of the liquid crystal panel 3 faces outwardly from the partition wall of the enclosed space 5, and the radiation fin 31 serving as part of the cooling means is attached there. Further, the image display surface of the liquid crystal panel 3 where incidence/emission of light occurs is within the enclosed space. With this arrangement, in addition to the advantages of the first embodiment, the cover glass which forms a window in the partition wall member is unnecessary, which simplifies the structure of the device.

Figure 6:
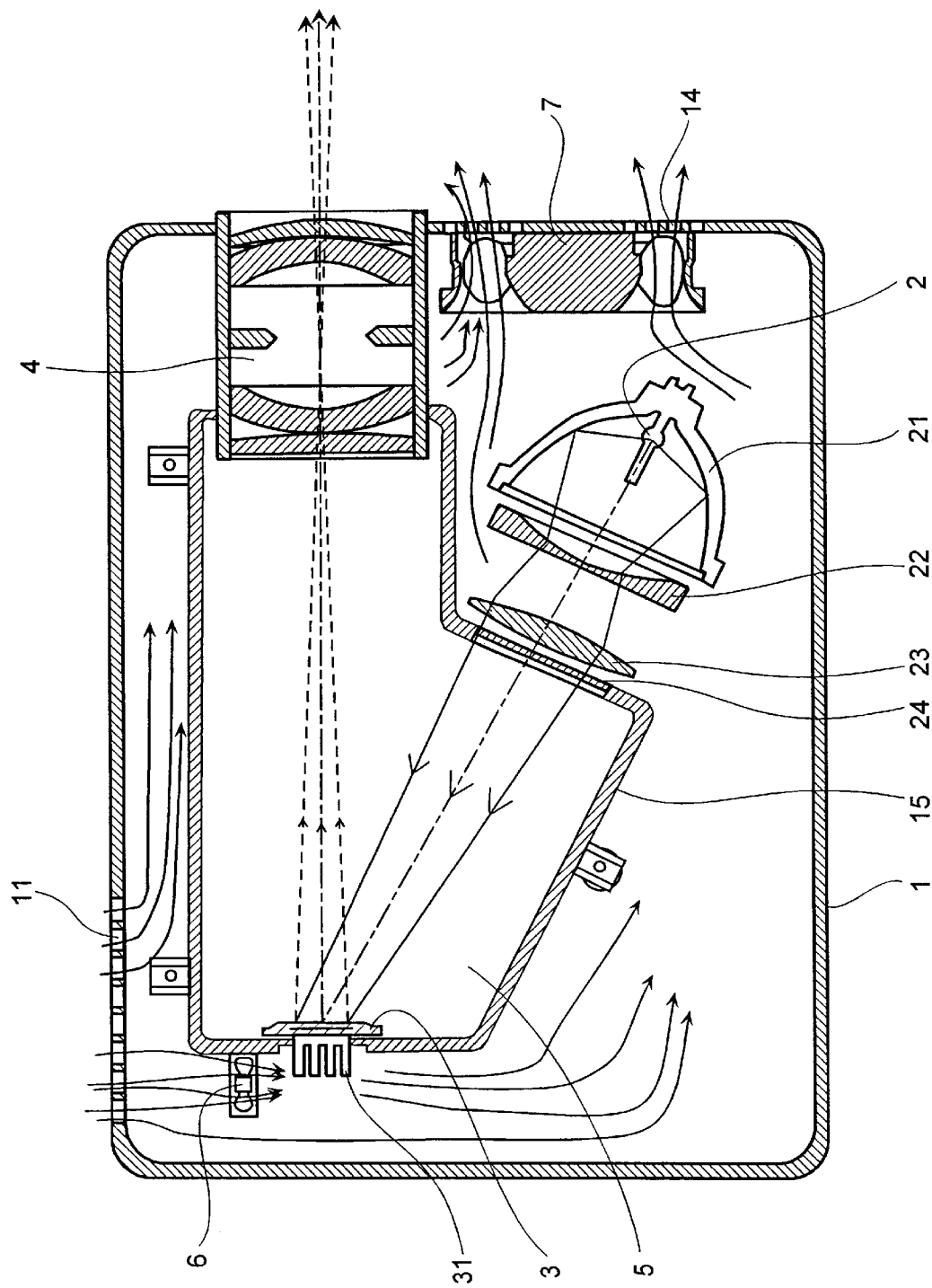
FIG. 6 is a cross sectional view showing the structure of the display device according to a third embodiment of the present invention.

Hereinbelow, a third embodiment of the present invention will be described. FIG. 6 shows the structure of the display device 1 according to the third embodiment. FIG. 6 shows a cross section of the display device 1 as in the case of FIG. 4.

The difference between the third embodiment and the first embodiment shown in FIG. 4 is that, in the present embodiment, the entire liquid crystal panel 3, operating as a reflecting type light valve means, is disposed within the enclosed space of the optical chassis 15, and the radiation fin 31, which forms a part of the radiation means connected to the radiation surface on the rear of the liquid crystal panel 3, serves as part of the partition wall of the optical chassis 15. In this arrangement, as in the case of the second embodiment, the structure of the device can be further simplified in comparison with the first embodiment.

Figure 7:
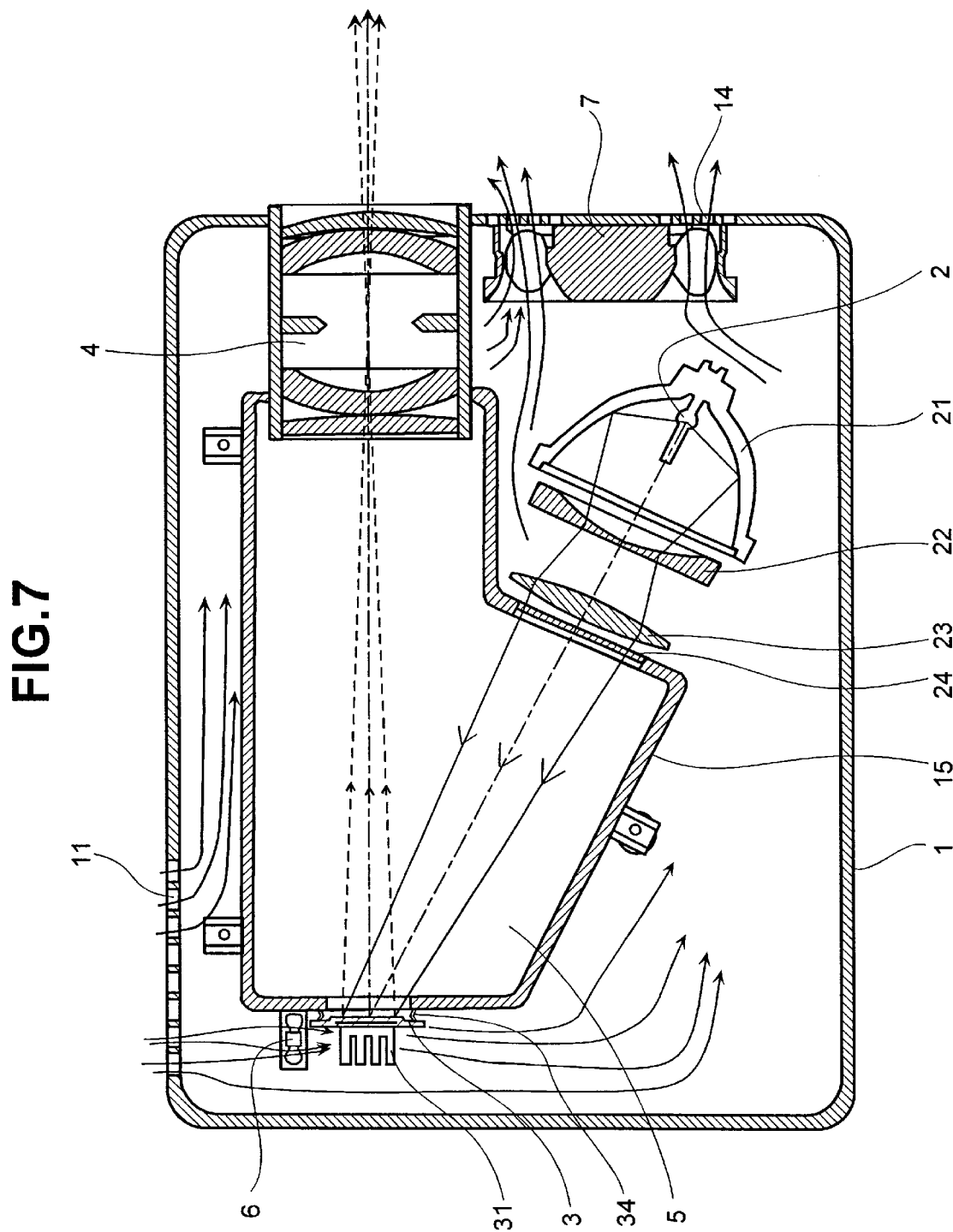
FIG. 7 is a cross sectional view showing the structure of the display device according to a fourth embodiment of the present invention.

Hereinbelow, a fourth embodiment of the present invention will be described. FIG. 7 shows the construction of the display device 1 according to the fourth embodiment. FIG. 7 shows a cross section of the display device 1 as in the case of FIG. 4.

Figure 8:
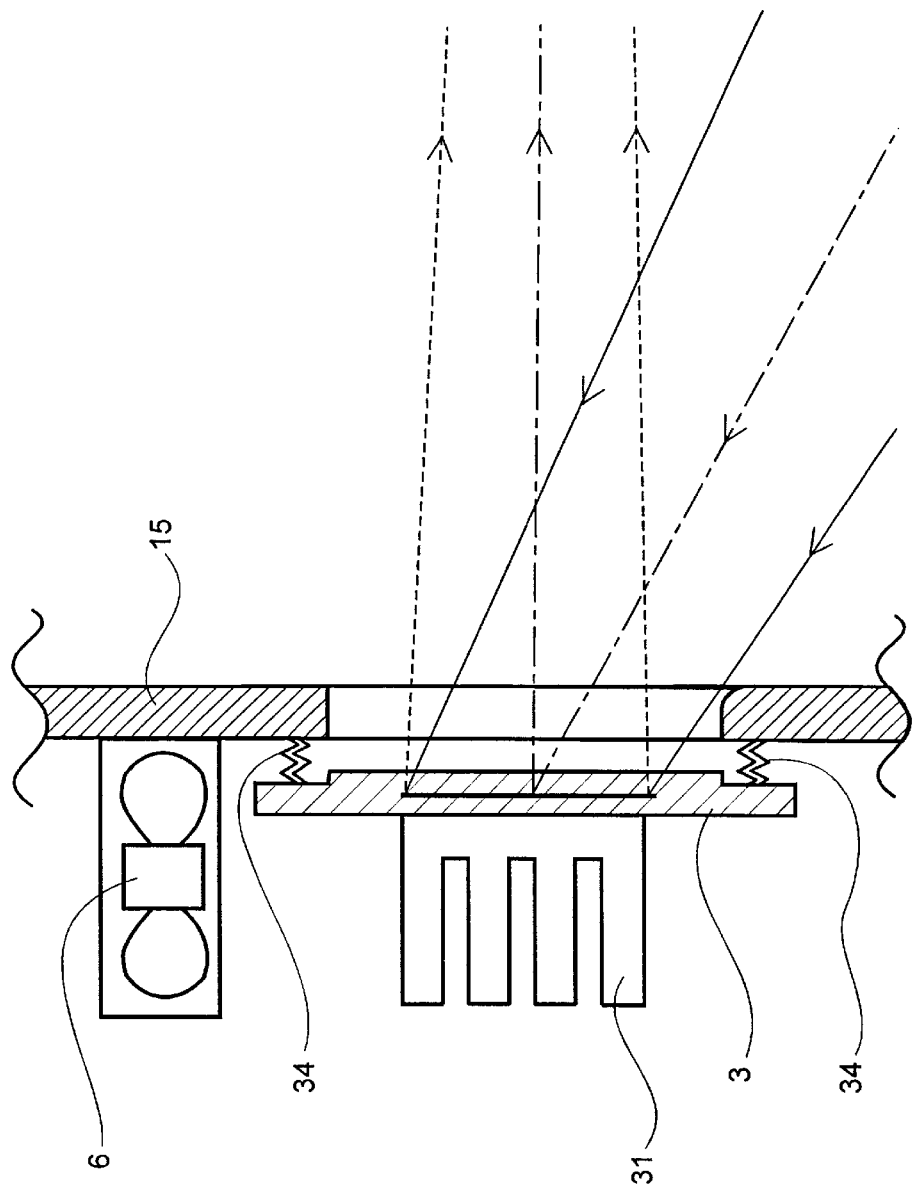
FIG. 8 is an expanded cross sectional view showing a liquid crystal panel attachment portion of the display device according to the fourth embodiment of the present invention.

The difference between the first embodiment shown in FIG. 4 is that, in the present embodiment, the liquid crystal panel 3, operating as a reflecting type light valve means, is connected to the partition wall of the optical chassis 15 forming the enclosed space 5 via a flexible bellows 34 in the present embodiment, as shown in FIG. 8, which represents an enlarged view of the liquid crystal panel 3 and the bellows 34, the bellows 34 and the liquid crystal panel 3 form a part of the partition wall of the enclosed space 5.

In some cases, the attachment position of the liquid crystal panel 3 must be adjusted to a predetermined reflection angle and position so as to correctly project a video image. In such case, according to the present embodiment, since the bellows 34 is provided between the wall forming the enclosed space of the optical chassis 15 and the liquid crystal panel 3, even if the attachment position of the liquid crystal panel 3 is moved, the flexible bellows 34, in a distorted state, will maintain the integrity of the enclosed space, In this manner, the adjustment is simple, and upon adjustment, the entrance of dust into the optical chassis can be prevented.

Figure 9:
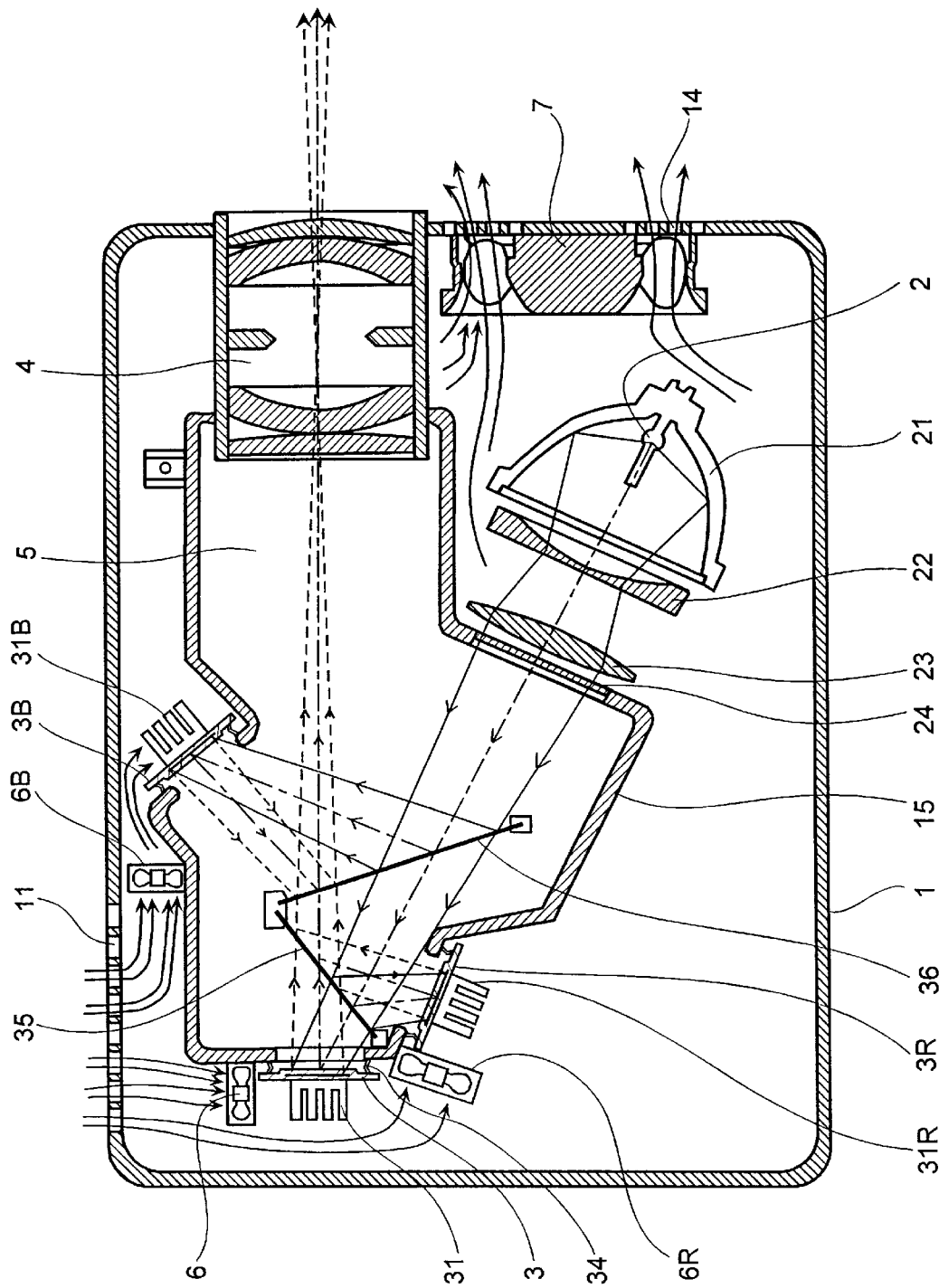
FIG. 9 is a cross sectional view showing the structure of the display device according to a fifth embodiment of the present invention.

Hereinbelow, a fifth embodiment of the present invention will be described. FIG. 9 shows the structure of the display device according to the fifth embodiment. FIG. 9 shows a cross section of the display device 1 as in the case of FIG. 4.

The fifth embodiment is capable of producing a color video image projection by providing three reflecting type light valve means, corresponding to the three primary colors of a video image, and providing light separation/combining means for use with respect to the three primary colors in the optical path.

In this display device, light generated from the electric bulb 2 becomes approximately collimated light, via the reflector 21 and the condenser lenses 22 and 23, and passes into the enclosed space 5 of the optical chassis 15 via the incidence cover glass 24. In the enclosed space 5, a dichroic mirror 36 and a dichroic mirror 35 are provided, respectively, for reflecting a blue color component of light having, e.g., a half-value breadth range of 400–500nm, a red color component of light having, e.g., half -value breadth range of 600–700 nm, and for passing the other light component. The blue color component of light is reflected by the dichroic mirror 36, and is directed toward a liquid crystal panel 3B. The remaining green and red color components pass through the dichroic mirror 35 and continue toward the next dichroic mirror 35. The red color component of light is reflected by the dichroic mirror 35 and is directed toward a liquid crystal panel 3R. The remaining green color component of light having, e.g., a wavelength range of 500–600 nm passes through the dichroic mirror 35 and continues toward the liquid crystal panel 3.

Lights reflected by the liquid crystal panels operating as reflecting type light valve means, so that the green color component of light is reflected from the liquid crystal panel 3 and is directed toward the dichroic mirror 35. The red color component of light is reflected from the liquid crystal panel 3R and is directed toward the dichroic mirror 35. The red color component of light is again reflected by the dichroic mirror 35, and is directed toward the projection lens 4. The red color component of light is combined with the green component of light which again passes through the dichroic mirror 35. Next, the blue color component of light is again reflected by the dichroic mirror 36 and is directed toward the projection lens 4. At this time, the blue color component of light is combined with the green color component and red color component of light. In this manner, the light finally enters the projection lens 4, and the light to be projected includes a combination of the blue, green and red primary color components. At this time, if the reflection angles, distances and parallelism and the like at the three liquid crystal panels are shifted from each other, the combined image will experience a shift in the colors, and, finally, a video image having an undesirable color shift will be projected.

Accordingly, the positions of the liquid crystal panels are adjusted to correct any color shift. As in the case of the fourth embodiment, a flexible bellows is attached between the respective liquid crystal panels and the wall of the optical unit 15, so that, even if the position of the liquid crystal panel is adjusted, the bellows maintains the integrity of the enclosed space.

The liquid crystal panels for the three primary colors, which operate as reflecting type light valve means, display images of the respective color components. The three liquid crystal panels are respectively provided with cooling means similar to the previous embodiments. Radiation fin 31B is attached to the liquid crystal panel 3B for the blue color component, and a flow of air from a radiation fan 6B is directed at the fin. Radiation fin 31R is attached to the liquid crystal panel 3R for the red color component, and a flow of air from a radiation fan 6R is directed at the fin. Further, radiation fin 31 is attached to the liquid crystal panel 3 for the green color component, and a flow of air from the radiation fan 6 is directed at this fin. In this manner, respective cooling means are provided for the three color components.

Air flow from the inlet port 11 is supplied to the cooling means for the three color components, and the air which is heated after thermal exchange is used for finally cooling the light source portion and than is discharged by the discharge fan 7 from the outlet port 14 to the outside the device 1.

In this manner, even in a color projection device using three panels for the three color components, the liquid crystal panels can be disposed in communication with the optical system within the enclosed space, as well as with the cooling means provided outside of the enclosed space.

Figure 10:
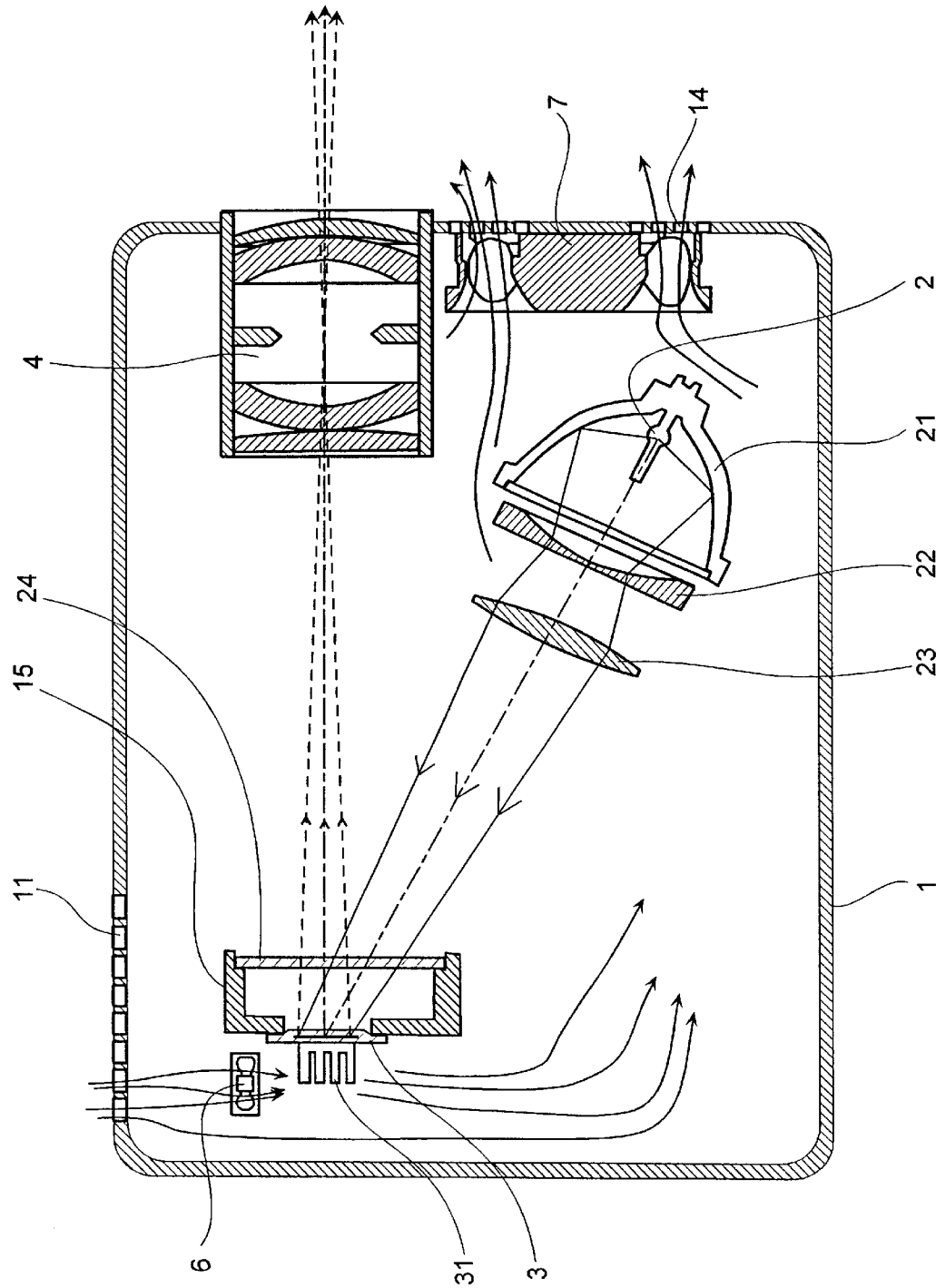
FIG. 10 is a cross sectional view showing the structure of the display device according to a sixth embodiment of the present invention.

Hereinbelow, a sixth embodiment of the present invention will be described. FIG. 10 shows the structure of the display device according to the sixth embodiment. FIG. 10 shows a cross section of the display device 1 as in the case of FIG. 4.

In the present embodiment, the enclosed space is disposed only around the liquid crystal panel which operates as a reflecting type light valve means. This reduces the size of the enclosed space, and upon adjustment of position at which the liquid crystal panel 3 is attached to the wall of the enclosed space, the entire enclosed space can be moved. Thus, adjustment can be easily made.

Figure 11:
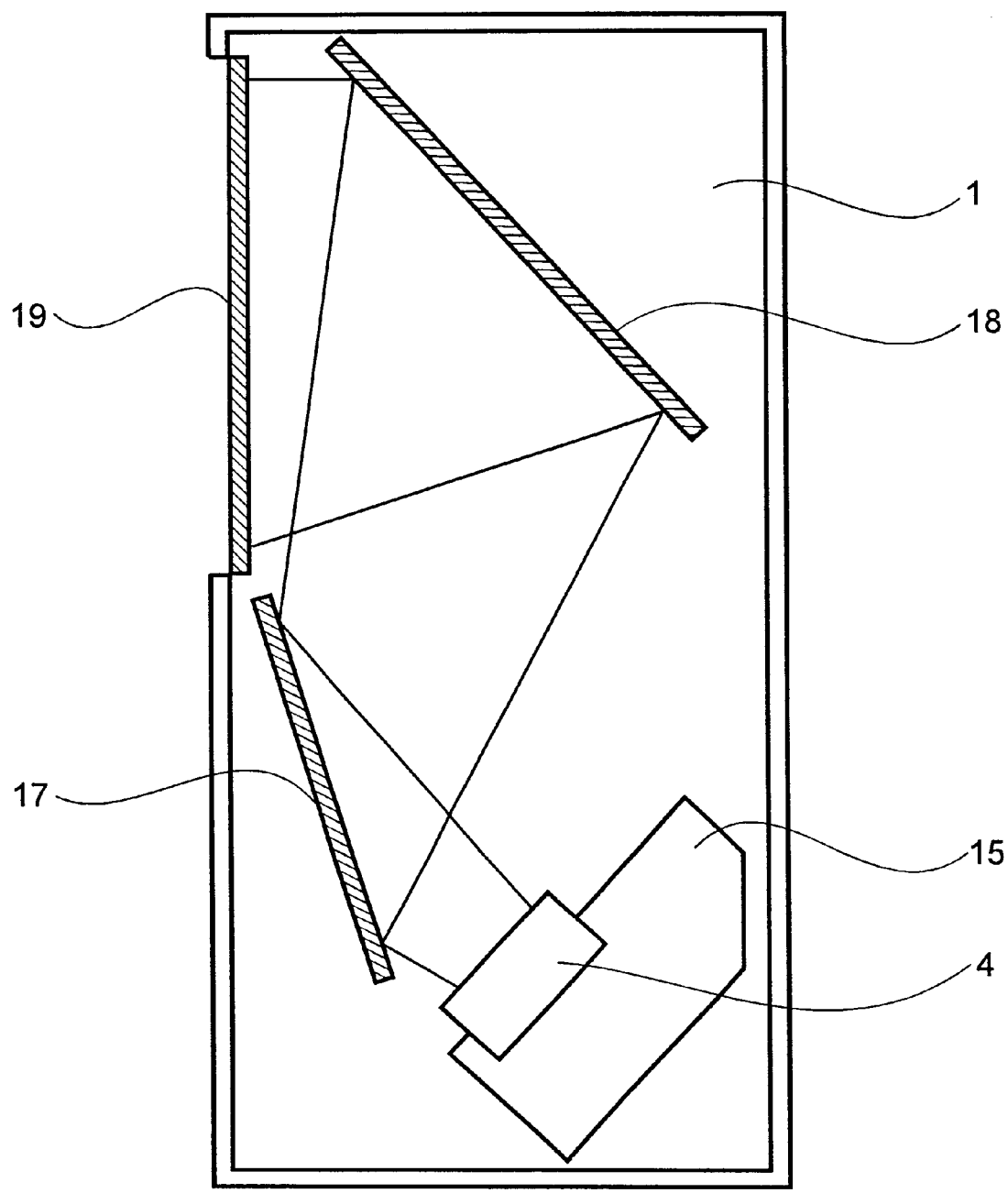
FIG. 11 is a cross sectional view showing the structure of the display device according to a seventh embodiment of the present invention.

Hereinbelow, a seventh embodiment of the present invention will be described. FIG. 11 shows a cross section of a video image display apparatus according to the seventh embodiment. In this video image display apparatus, a display device having a construction similar to one of the above-described first to sixth embodiments is employed to project a video image on a screen 19 which forms part of the apparatus, rather than on an external screen or the like, as previously described.

In FIG. 11, the optical chassis 15 is attached inside of a rear-surface projection type display device 1'. The inside of the optical chassis 15 is similar to that shown in FIGS. 2 to 9. A video image projected from the projection lens 4 of the optical chassis 15 passes through a mirror 17 and a mirror 18, and is projected onto a screen 19 so as to be displayed. Note that in FIG. 11, the light source is omitted.

In this manner, a display device is incorporated in a rear-surface projection type display apparatus and, has similar advantages to those described with reference to the first to sixth embodiments.

Figure 12:
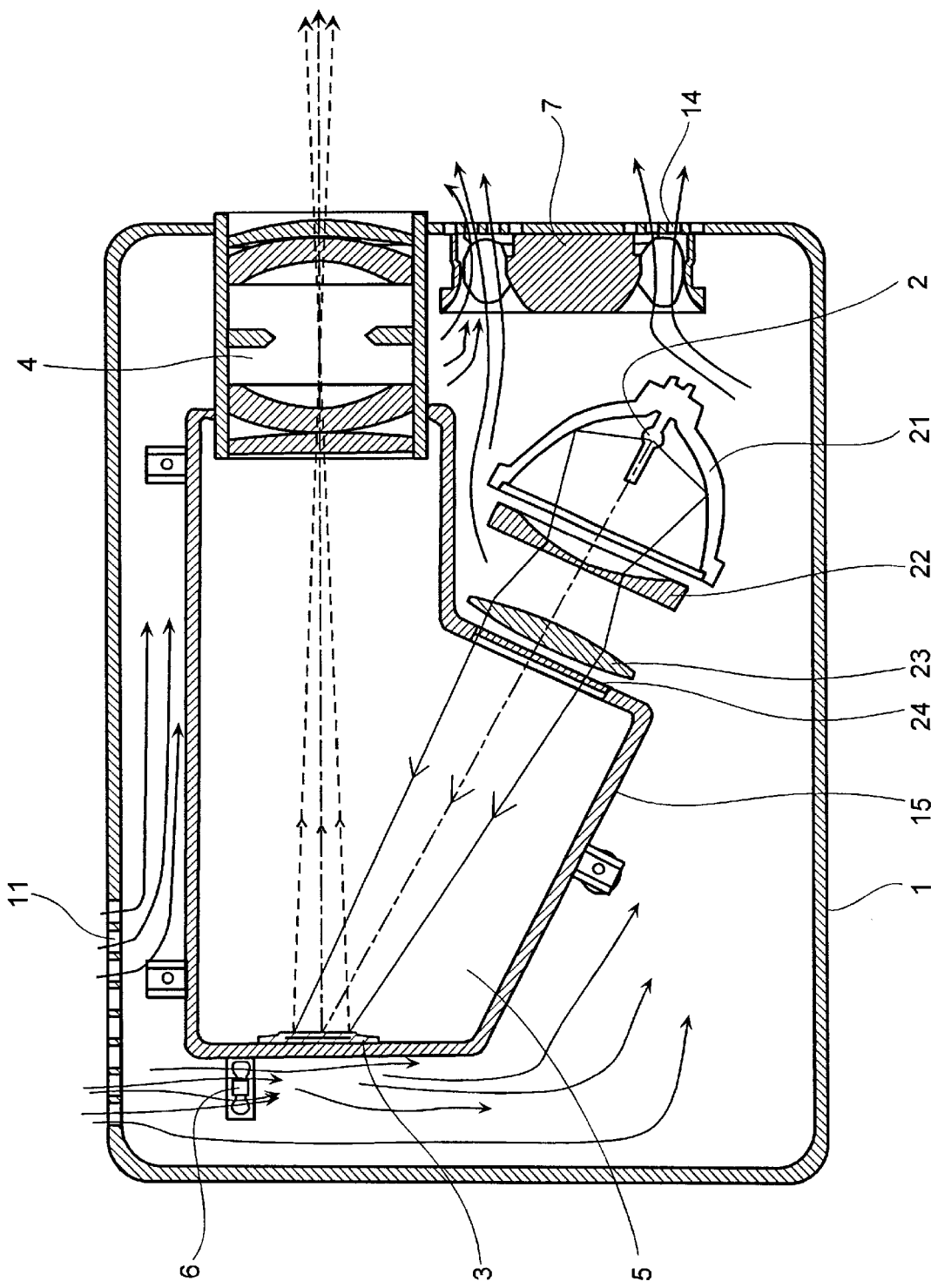
FIG. 12 is a cross sectional view showing the structure of the display device according to an eighth embodiment of the present invention.

Hereinbelow, an eighth embodiment of the present invention will be described. FIG. 12 shows the structure of the display device according to the eighth embodiment. FIG. 12 shows a cross section of the display device as in the case of FIG. 4.

The difference between this embodiment and the first embodiment shown in FIG. 4 is that, in the eighth embodiment, the liquid crystal panel 3, which operates as a reflecting type light valve means, is provided entirely within the enclosed space 5, and the radiation surface side of the panel on the rear surface thereof is directly in contact with the wall surface of the optical chassis 15. In this arrangement, the wall surface of the optical chassis 15 can be used as a cooling means. The liquid crystal panel 3 can be cooled by cooling the outside of the optical chassis 15 by using the radiation fan 6 or the like. Note that in this case, the wall of the optical chassis 15 is formed of a material having a good thermal conductivity, such as a metal.

Various embodiments of the video image display device according to the present invention have been described above. Note that in the above description, the light-polarizing light-reflecting liquid-crystal panel is used as a reflecting type light valve means, however, light valve devices of other types, e.g., a reflecting type light valve means of the scattering light-reflecting liquid-crystal panel type, a micro-mirror (micro-mirror drive) type panel, a laser-liquid-crystal writing reflecting type panel and the like, can be employed, and similar advantages can be obtained.

Further, in the above description, the optical system uses a dioptric lens, however, optical devices other than a dioptric lens, such as a reflection mirror lens or a combination of a dioptric lens and a reflection mirror lens may be used.

Further, if only the part of video image display mechanism (the part in the external casing of the video display device) or the optical chassis is directly provided in a building or the like, the external part may be integrated with the building, and similar advantages can be obtained.

Further, in the fourth embodiment described above, a member having a bellows structure is used as a flexible member connecting the liquid crystal panel to the optical chassis, however, any other flexible members which do not allow dust to pass, such as sponge foam, may be employed. In this case, similar advantages can be obtained. That is, in the above embodiments, the enclosed space 5 may be employed as long as it is sealed against dust, and this does not pose any limitation on the scope of the present invention.

As described above, in the various embodiments, the side of the incidence/emission surface of a reflecting type light valve device is provided in a space sealed (protected) against dust, and a radiation surface on the rear surface side of the light value device is connected to cooling means outside the enclosed space. This efficiently dissipates heat generated in the reflecting type light valve means and prevents the entrance of dust from the outside into the enclosed space. Further, the attachment position of the light valve device can be adjusted without breaking the seal of the enclosed space by connecting the light valve device to the optical chassis with a flexible member.

As described above, according to the present invention, a projection type display device which prevents dust from collecting around a light valve device and efficiently cools the light valve device can be provided.

The display device according to the present invention is available as a liquid crystal projector device, a liquid crystal television set, a projection type display device and the like, and the present invention is especially applicable to efficient execution of dust prevention around a light valve device and cooling with respect to the light valve device.

What is claimed is:

1. A display apparatus comprising:
   a reflecting type light valve which controls light according to an image signal;
   a drive circuit which drives said reflecting type light valve by supplying said image signal;
   a cooling system which cools at least said reflecting type light valve by cooling fluid;
   a partition wall which partitions off a part space in said display apparatus;
   wherein said reflecting type light valve, together with said partition wall, forms an enclosed space including an incidence/emission optical system of said reflecting type light valve, and wherein a part opposite to a light incidence/emission surface of said reflecting type light valve is cooled by said cooling system; and
   wherein said enclosed space is configured so as to prevent fluid flow from outside of said enclosed space into said enclosed space.

2. A display apparatus according to claim 1, wherein at least a part of said partition wall comprises a flexible member, and wherein said reflecting type light valve is connected to said flexible member.

3. A display apparatus comprising:
   a reflecting type light valve which controls light according to an image signal;
   a drive circuit which drives said reflecting type light valve by supplying said image signal;
   a cooling system which cools at least said reflecting type light valve by cooling fluid;
   a partition wall which partitions off a part space in said display apparatus;
   a light through member which is attached to said partition wall and provided on the side of a light incidence/emission surface of said reflecting type light valve;
   wherein said partition wall, together with said light through member, forms an enclosed space including an incidence/emission optical system of said reflecting type light valve opposite to said reflecting type light valve and a part opposite to said light incidence/emission surface is connected to said cooling system outside of said enclosed space; and
   wherein said enclosed space is configured so as to prevent fluid flow from outside of said enclosed space into said enclosed space.

4. A display apparatus according to claim 3, wherein at least a part of said partition wall comprises a flexible member, and wherein said reflecting type light valve is connected to said flexible member.

5. A display apparatus comprising:
   a reflecting type light valve which controls light according to an image signal;
   a drive circuit which drives said reflecting type light valve by supplying said image signal;
   a cooling system which cools at least said reflecting type light valve by cooling fluid;
   a partition wall which partitions off a part space in said display apparatus;
   wherein said partition wall, together with said reflecting type light valve, forms an enclosed space including an incidence/emission optical system, and wherein a radiation member is provided on an opposite side to said light incidence/emission surface such that said radiation member is cooled by said cooling system outside of said enclosed space; and
   wherein said enclosed space is configured so as to prevent fluid flow from outside of said enclosed space into said enclosed space.

6. A display apparatus according to claim 5, wherein said radiation member is provided with its main radiation surface being outside of said enclosed space.

7. A display apparatus according to claim 6, wherein at least a part of said partition wall comprises a flexible member, and wherein said reflecting light valve is connected to said flexible member.

8. A display apparatus according to claim 5, wherein at least a part of said partition wall comprises a flexible member, and wherein said reflecting type light valve is connected to said flexible member.

9. A display apparatus comprising:
   a reflecting type light valve which controls light according to an image signal;
   a drive circuit which drives said reflecting type light valve by supplying said image signal;
   a cooling system which cools at least said reflecting type light valve by cooling fluid;
   a partition wall which has thermal conductivity, and which partitions off a part space in said display apparatus;
   wherein said partition wall, together with said reflecting type light valve, forms an enclosed space including an incidence/emission optical system, and wherein said reflecting type light valve is attached to said partition wall such that a light incidence/emission surface of said reflecting type light valve is on the side of said optical system, and said cooling system, provided outside of said enclosed space, cools said reflecting type light valve via said partition wall; and
   wherein said enclosed space is configured so as to prevent fluid flow from outside of said enclosed space into said enclosed space.

10. A display apparatus according to claim 9, wherein at least a part of said partition wall comprises a flexible member, and wherein said reflecting light valve is connected to said flexible member.

11. An optical unit comprising:
    a reflecting type light valve which controls light according to an image signal;
    a partition wall which partitions off a part space in said optical unit;

wherein said reflecting type light valve, together with said partition wall, forms an enclosed space including an incidence/emission optical system, and wherein a part opposite to a light incidence/emission surface of said reflecting type light valve can be connected to a cooling system outside of said enclosed space; and wherein said enclosed space is configured so as to prevent fluid flow from outside of said enclosed space into said enclosed space.

12. An optical unit comprising:

a reflecting type light valve which controls light according to an image signal;

a partition wall which partitions off a part space in said optical unit;

a light through member which is attached to said partition wall and provided on the side of a light incidence/emission surface of said reflecting type light valve;

wherein said partition wall, together with said light through member, forms an enclosed space including an incidence/emission optical system of said reflecting type light valve and wherein a part opposite to said light incidence/emission surface of said reflecting type light valve can be cooled by cooling fluid; and wherein said enclosed space is configured so as to prevent fluid flow from outside of said enclosed space into said enclosed space.

13. An optical unit comprising:

a reflecting type light valve which controls light according to an image signal;

a partition wall which partitions off a part space in said optical unit;

wherein said partition wall, together with said reflecting type light valve, forms an enclosed space including an incidence/emission optical system, and wherein a radiation member is provided on an opposite side to a light incidence/emission surface of said reflecting type light valve such that said radiation member can be cooled by cooling fluid outside of said enclosed space; and wherein said enclosed space is configured so as to prevent fluid flow from outside of said enclosed space into said enclosed space.

14. An optical unit comprising:

a reflecting type light valve which controls light according to an image signal;

a partition wall which has thermal conductivity, and which partitions off a part space in said optical unit;

wherein said partition wall, together with reflecting type light valve, forms an enclosed space including an incidence/emission optical system, and wherein said reflecting type light valve is attached to the side of said partition wall such that a light incidence/emission surface of said reflecting type light valve is on the side of said optical system, and said reflecting type light valve can be cooled by cooling fluid via said partition wall; and wherein said enclosed space is configured so as to prevent fluid flow from outside of said enclosed space into said enclosed space.

15. A display apparatus comprising:

a reflecting type panel which controls light according to an image signal;

a drive circuit which drives said reflecting type panel by supplying said image signal to said reflecting type panel;

a cooling system which cools at least said reflecting type panel by cooling fluid;

a first space in which an incidence/emission optical system of said reflecting type panel is formed;

a second space in which a flow path of cooling fluid is formed;

wherein said reflecting type panel is provided so as to direct its incidence/emission part to said first space and forms a light control part of said incidence/emission optical system, and in a state where at least a part opposite to said light incidence/emission part, or a radiation part of said reflecting type panel is cooled by said cooling fluid in said second space; and wherein said first space is configured so as to prevent fluid flow from outside of said first space into said first space.

16. A display apparatus comprising:

a reflecting type panel which controls light according to an image signal;

a drive circuit which drives said reflecting type panel by supplying said image signal to said panel;

a cooling system which cools at least said reflecting type panel by cooling fluid;

a member which includes a part which supports said reflecting type panel;

wherein an incidence/emission optical system of said reflecting type panel is formed in a region enclosed by said reflecting type panel and said member, and said reflecting type panel is provided so as to direct its incidence/emission part to said region and forms a light control part of said incidence/emission optical system, and in a state where at least a part opposite to said light incidence/emission part, or a radiation part of said reflecting type panel is cooled by said cooling fluid flowing outside said member; and wherein said region enclosed by said reflection type panel and said member is configured so as to prevent fluid flow from outside of said region into said region.

17. A display apparatus according claim 16, wherein said member comprises a flexible supporting member, and wherein said reflecting type panel is connected to said flexible member.

18. A display apparatus comprising:

a reflecting type panel which controls light according to an image signal;

a drive circuit which drives said reflecting type panel by supplying said image signal to said reflecting type panel;

a cooling system which cools at least said reflecting type panel by cooling fluid;

a space in which an incidence/emission optical system of said reflecting type panel is formed;

wherein said reflecting type panel is provided so as to direct its light incidence/emission part to said space and said light incidence/emission part forms a light control part of said incidence/emission optical system, and in a state where at least a part opposite to said light incidence/emission part, or a radiation part of said reflecting type panel is cooled by said cooling fluid flowing outside of said space; and wherein said space is configured so as to prevent fluid flow from outside of said space into said space.

19. A display apparatus comprising:

a reflecting type panel which controls light according to an image signal;

a drive circuit which drives said reflecting type panel by supplying said image signal to said reflecting type panel;

a cooling system which cools at least said reflecting type panel by cooling fluid;

a partition member which partitions a space into a first and a second space, the first space being a space in which an incidence/emission optical system of said reflecting type panel is formed, and the second space being a space in which a flow path of cooling fluid is formed;

wherein, to said partition member, said reflecting type panel is provided so as to direct its incidence/emission part to said first space and forms a light control part of said incidence/emission optical system, and in a state where at least a part opposite to said light incidence/emission part, or a radiation part of said reflecting type panel is cooled by said cooling fluid in said second space; and wherein said first space is configured so as to prevent fluid flow from outside of said first space into said first space.

20. A display apparatus according claim 19, wherein said partition member encloses said incidence/emission optical system in a state that said reflecting type panel is attached.

21. A display apparatus according claim 20, wherein at least a part of said partition member comprises a flexible member, and wherein said reflecting type panel is connected to said flexible member.

22. A display apparatus according claim 19, wherein said partition member encloses said first space in a state that said reflecting type panel is attached.

23. A display apparatus according claim 19, wherein said partition member comprises metal having a thermal conductivity.

24. A display apparatus according claim 19, wherein at least a part of said partition member comprises a flexible member, and wherein said reflecting type panel is connected to said flexible member.

25. A display apparatus comprising:

a reflecting type panel which controls light according to an image signal;

a drive circuit which drives said reflecting type panel by supplying said image signal to said reflecting type panel;

a cooling system which cools at least said reflecting type panel by cooling fluid;

a partition member which partitions a space into a first and a second space, the first space being a space in which an incidence/emission optical system of said reflecting type panel is formed, and the second space being a space in which a flow path of said cooling fluid is formed;

wherein, to said partition member, said reflecting type panel is provided so as to direct its incidence/emission part to said first space and forms a light control part of said incidence/emission optical system, and in a state where at least a part opposite to said light incidence/emission part, or a radiation part of said reflecting type panel is arranged so as to be in a flow path of said cooling fluid in said second space for cooling; and wherein said first space is configured so as to prevent fluid flow from outside of said first space into said first space.

26. A display apparatus comprising:

a reflecting type panel which controls light according to an image signal;

a drive circuit which drives said reflecting type panel by supplying said image signal to said reflecting type panel;

a cooling system which cools at least said reflecting type panel by cooling fluid;

a partition member which partitions a space into a first and a second space, the first space being a space in which an incidence/emission optical system of said reflecting type panel is formed, and the second space being a space in which a flow path of said cooling fluid is formed;

a light through member which makes an incident light pass through;

wherein, to said partition member, said reflecting type panel is provided so as to direct its incidence/emission part to said first space and to make a light from a light source enter to said incidence/emission part through said light through member, and in a state where at least a part opposite to said light incidence/emission part, or a radiation part of said reflecting type panel is arranged so as to be cooled by said cooling fluid in said second space; and wherein said first space is configured so as to prevent fluid flow from outside of said first space into said first space.

27. A display apparatus according claim 26, wherein at least a part of said partition member comprises a flexible member, and wherein said reflecting type panel is connected to said flexible member.

28. A display apparatus according to claim 26, wherein said light through member is a cover glass.

29. An optical unit comprising:

a reflecting type panel which controls light according to an image signal;

a partition member which partitions a space into a first and a second space, the first space being a space in which an incidence/emission optical system of said reflecting type panel is formed, and the second space being a space in which a flow path of cooling fluid is formed;

wherein, to said partition member, said reflecting type panel is provided so as to direct its incidence/emission part to said first space and to make a light from a light source enter to said incidence/emission part, and in a state where at least a part opposite to said light incidence/emission part, or a radiation part of said reflecting type panel is arranged so as to be cooled by said cooling fluid in said second space; and wherein said first space is configured so as to prevent fluid flow from outside of said first space into said first space.

30. An optical unit comprising:

a reflecting type panel which controls light according to an image signal;

a partition member which partitions a space into a first and a second space, the first space being a space in which an incidence/emission optical system of said reflecting type panel is formed, the second space being a space in which a flow path of cooling fluid is formed;

a light through member which makes an incident light pass through;

wherein, to said partition member, said reflecting type panel is provided so as to direct its incidence/emission part to said first space and to make a light-from a light source enter to said incidence/emission part through said light through member, and in a state where at least a part opposite to said light incidence/emission part, or a radiation part of said reflecting type panel is arranged so as to be cooled by said cooling fluid in said second space; and wherein said first space is configured so as to prevent fluid flow from outside of said first space into said first space.

31. A display apparatus comprising:

a reflecting type panel which controls light according to an image signal;

a drive circuit which drives said reflecting type panel by supplying said image signal to said reflecting type panel;

a cooling system which cools at least said reflecting type panel by cooling fluid;

a partition member which partitions a space into a first and a second space, the first space being a space in which an incidence/emission optical system of said reflecting type panel is formed, and the second space being a space in which a flow path of said cooling fluid is formed;

a projection lens which projects a ray of emission light from said reflecting type panel to form an image on a screen;

wherein, to said partition member, said reflecting type panel is provided so as to direct its incidence/emission part to said first space and forms a light control part of said incidence/emission optical system, and in a state where at least a part opposite to said light incidence/emission part, or a radiation part of said reflecting type panel is cooled by said cooling fluid in said second space, and said projection lens is attached to said partition member in a state that an optical axis of said projection lens goes through said partition member; and wherein said first space is configured so as to prevent fluid flow from outside of said first space into said first space.

32. An optical unit comprising:

a reflecting type panel which controls light according to an image signal;

a partition member which partitions a space into a first and a second space, the first space being a space in which an incidence/emission optical system of said reflecting type panel is formed, and the second space being a space in which a flow path of cooling fluid is formed;

a projection lens which projects a ray of emission light from said reflecting type panel to form an image on a screen;

wherein, to said partition member, said reflecting type panel is provided so as to direct its incidence/emission part to said first space and forms a light control part of said incidence/emission optical system, and in a state where at least a part opposite to said light incidence/emission part, or a radiation part of said reflecting type panel is cooled by said cooling fluid in said second space, and said projection lens is attached to said partition member in a state that an optical axis of said projection lens goes through said partition member; and wherein said first space is configured so as to prevent fluid flow from outside of said first space into said first space.

* * * * *